United States Patent
Wu et al.

(10) Patent No.: US 10,859,685 B2
(45) Date of Patent: *Dec. 8, 2020

(54) CALIBRATION OF LASER SENSORS

(71) Applicant: SZ DJI TECHNOLOGY CO., LTD., Shenzhen (CN)

(72) Inventors: Kanzhi Wu, Shenzhen (CN); Lu Ma, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 50 days.

This patent is subject to a terminal disclaimer.

(21) Appl. No.: 16/171,994

(22) Filed: Oct. 26, 2018

(65) Prior Publication Data

US 2019/0064333 A1 Feb. 28, 2019

Related U.S. Application Data

(63) Continuation of application No. 15/730,572, filed on Oct. 11, 2017, now Pat. No. 10,120,068, which is a (Continued)

(51) Int. Cl.
*G01S 7/497* (2006.01)
*G01B 11/26* (2006.01)
(Continued)

(52) U.S. Cl.
CPC ............ *G01S 7/4972* (2013.01); *G01B 11/24* (2013.01); *G01B 11/26* (2013.01); *G01B 21/042* (2013.01);
(Continued)

(58) Field of Classification Search
CPC ...... G01S 7/4972; G01S 7/4808; G01S 17/42; G01S 17/89; G01S 13/867; G01S 13/931; G01B 11/24; G01B 11/26; G01B 21/042
See application file for complete search history.

(56) References Cited

U.S. PATENT DOCUMENTS

| | | |
|---|---|---|
| 4,283,116 A | 8/1981 | Weis |
| 5,179,565 A | 1/1993 | Tsuchiya et al. |

(Continued)

FOREIGN PATENT DOCUMENTS

| | | |
|---|---|---|
| CN | 101216562 A | 7/2008 |
| CN | 101256232 A | 9/2008 |

(Continued)

OTHER PUBLICATIONS

International Searching Authority, The International Search Report and Written Opinion of the International Searching Authority, PCT/CN2017/082584, dated Jan. 30, 2018, 12 pages.

(Continued)

*Primary Examiner* — Bryan Bui
(74) *Attorney, Agent, or Firm* — Finnegan, Henderson, Farabow, Garrett & Dunner, LLP

(57) ABSTRACT

Automatic calibration of laser sensors carried by a mobile platform, and associated systems and methods are disclosed herein. A representative method includes determining an overlapping region of point cloud data generated by laser sensors, comparing surface features of the point clouds within the overlapping region, and generating calibration rules based thereon.

20 Claims, 14 Drawing Sheets

Related U.S. Application Data continuation of application No. PCT/CN2017/082584, filed on Apr. 28, 2017.

(51) Int. Cl.

| | | |
|---|---|---|
| G01S 17/89 | (2020.01) | |
| G01S 13/931 | (2020.01) | |
| G01S 17/42 | (2006.01) | |
| G01S 13/86 | (2006.01) | |
| G01B 21/04 | (2006.01) | |
| G01B 11/24 | (2006.01) | |
| G01S 7/48 | (2006.01) | |

(52) U.S. Cl.
CPC .......... *G01S 7/4808* (2013.01); *G01S 13/867* (2013.01); *G01S 13/931* (2013.01); *G01S 17/42* (2013.01); *G01S 17/89* (2013.01)

(56) References Cited

U.S. PATENT DOCUMENTS

| | | | |
|---|---|---|---|
| 5,249,046 A | 9/1993 | Ulich et al. | |
| 6,101,455 A | 8/2000 | Davis | |
| 6,246,258 B1 | 6/2001 | Lesea | |
| 6,344,937 B1 | 2/2002 | Sparrold et al. | |
| 6,666,855 B2 | 12/2003 | Somani et al. | |
| 7,085,400 B1 | 8/2006 | Holsing et al. | |
| 7,236,299 B1 | 6/2007 | Smith et al. | |
| 7,336,407 B1 | 2/2008 | Adams et al. | |
| 7,564,571 B2 | 7/2009 | Karabassi et al. | |
| 7,843,448 B2 | 11/2010 | Wheeler et al. | |
| 7,899,598 B2 | 3/2011 | Woon et al. | |
| 8,224,097 B2 | 7/2012 | Matei et al. | |
| 8,396,293 B1 | 3/2013 | Korah et al. | |
| 8,488,877 B1 | 7/2013 | Owechko et al. | |
| 8,503,046 B2 | 8/2013 | Mikkelsen et al. | |
| 8,605,998 B2 | 12/2013 | Samples et al. | |
| 8,620,089 B1 | 12/2013 | Korah et al. | |
| 8,665,122 B2 | 3/2014 | Klepsvik | |
| 8,773,182 B1 | 7/2014 | Degani et al. | |
| 8,798,372 B1 | 8/2014 | Korchev et al. | |
| 9,076,219 B2 | 7/2015 | Cha et al. | |
| 9,097,804 B1 | 8/2015 | Silver et al. | |
| 9,098,753 B1 | 8/2015 | Zhu et al. | |
| 9,128,190 B1 | 9/2015 | Ulrich et al. | |
| 9,369,697 B2 | 6/2016 | Kumagai et al. | |
| 9,383,753 B1 | 7/2016 | Templeton et al. | |
| 9,396,545 B2 | 7/2016 | Fu et al. | |
| 9,470,548 B2 | 10/2016 | Ahn et al. | |
| 9,584,748 B2 | 2/2017 | Saito | |
| 9,644,857 B1 | 5/2017 | Ashgriz et al. | |
| 9,659,378 B2 | 5/2017 | Sasaki et al. | |
| 10,120,068 B1 * | 11/2018 | Wu | G01S 17/89 |
| 10,436,884 B2 * | 10/2019 | Wu | G05D 1/0246 |
| 2004/0135992 A1 | 7/2004 | Munro | |
| 2005/0248749 A1 | 11/2005 | Kiehn et al. | |
| 2005/0254628 A1 | 11/2005 | Saladin et al. | |
| 2007/0214687 A1 | 9/2007 | Woon et al. | |
| 2007/0296951 A1 | 12/2007 | Kuijk et al. | |
| 2008/0114253 A1 | 5/2008 | Randall et al. | |
| 2008/0319706 A1 | 12/2008 | Uffenkamp et al. | |
| 2009/0310867 A1 | 12/2009 | Matei et al. | |
| 2010/0271615 A1 | 10/2010 | Sebastian et al. | |
| 2011/0285981 A1 | 11/2011 | Justice et al. | |
| 2012/0032541 A1 | 2/2012 | Chen et al. | |
| 2012/0121166 A1 | 5/2012 | Ko et al. | |
| 2012/0170024 A1 | 7/2012 | Azzazy et al. | |
| 2012/0170029 A1 | 7/2012 | Azzazy et al. | |
| 2012/0248288 A1 | 10/2012 | Linder et al. | |
| 2012/0256916 A1 | 10/2012 | Kitamura et al. | |
| 2013/0107243 A1 | 5/2013 | Ludwig et al. | |
| 2013/0284475 A1 | 10/2013 | Hirabayashi et al. | |
| 2013/0329065 A1 | 12/2013 | Haraguchi et al. | |
| 2014/0049765 A1 | 2/2014 | Zhelenznyak et al. | |
| 2014/0071121 A1 | 3/2014 | Russ et al. | |
| 2014/0132723 A1 | 5/2014 | More | |
| 2014/0368651 A1 | 12/2014 | Irschara et al. | |
| 2015/0185313 A1 | 7/2015 | Zhu | |
| 2015/0206023 A1 | 7/2015 | Kochi et al. | |
| 2015/0219920 A1 | 8/2015 | Ando et al. | |
| 2016/0070981 A1 | 3/2016 | Sasaki et al. | |
| 2016/0154999 A1 | 6/2016 | Fan et al. | |
| 2016/0311528 A1 | 10/2016 | Nemovi et al. | |
| 2016/0327779 A1 | 11/2016 | Hillman | |
| 2017/0046840 A1 | 2/2017 | Chen et al. | |
| 2017/0046845 A1 | 2/2017 | Boyle et al. | |
| 2017/0153319 A1 | 6/2017 | Villeneuve et al. | |
| 2017/0178352 A1 | 6/2017 | Harmsen et al. | |
| 2017/0227628 A1 | 8/2017 | Zheleznyak et al. | |
| 2017/0248698 A1 | 8/2017 | Sebastian et al. | |
| 2017/0316701 A1 | 11/2017 | Gil et al. | |
| 2018/0357503 A1 | 12/2018 | Wang et al. | |
| 2018/0365835 A1 | 12/2018 | Yan et al. | |

FOREIGN PATENT DOCUMENTS

| | | |
|---|---|---|
| CN | 202182717 U | 4/2012 |
| CN | 102508255 A | 6/2012 |
| CN | 102944224 A | 2/2013 |
| CN | 102971657 A | 3/2013 |
| CN | 103257342 A | 8/2013 |
| CN | 103257348 A | 8/2013 |
| CN | 103403577 A | 11/2013 |
| CN | 103499819 A | 1/2014 |
| CN | 203645633 U | 6/2014 |
| CN | 103969637 A | 8/2014 |
| CN | 103983963 A | 8/2014 |
| CN | 104463872 A | 3/2015 |
| CN | 104600902 A | 5/2015 |
| CN | 105517903 A | 4/2016 |
| CN | 105628026 A | 6/2016 |
| CN | 105759253 A | 7/2016 |
| CN | 106019296 A | 10/2016 |
| CN | 106019923 A | 10/2016 |
| CN | 106030431 A | 10/2016 |
| CN | 106063089 A | 10/2016 |
| CN | 106093958 A | 11/2016 |
| CN | 106093963 A | 11/2016 |
| CN | 106199622 A | 12/2016 |
| CN | 106597414 A | 4/2017 |
| CN | 106597416 A | 4/2017 |
| CN | 107037721 A | 8/2017 |
| JP | 63194211 A | 8/1988 |
| JP | 2002199682 A | 7/2002 |
| JP | 2005321547 A | 11/2005 |
| JP | 2015200555 A | 11/2015 |
| JP | 6076541 B2 | 2/2017 |
| KR | 101665938 B1 | 10/2016 |
| WO | 2015148824 A1 | 10/2015 |
| WO | 2016127357 A1 | 8/2016 |
| WO | 2016170333 A1 | 10/2016 |
| WO | 2017021778 A2 | 2/2017 |

OTHER PUBLICATIONS

Aijazi, et al., "Segmentation Based Classification of 3D Urban Point Clouds: A Super-Voxel Based Approach with Evaluation," 2013.
Douillard, et al., "On the Segmentation of 3D LIDAR Point Clouds," 2011.
Hackel, et al., "Fast Semantic Segmentation of 3D Point Clouds with Strongly Varying Density," 2016.
Levinson, et al., "Automatic Online Calibration of Cameras and Lasers," 2013.
Liu, et al., "A 3.9 ps RMS Resolution Time-To-Digital Converter Using Dual-sampling Method on Kintex UltraScale FPGA," 2006.
Montemerlo, et al., "Junior: The Stanford Entry in the Urban Challenge," 2008.
Palka, et al., "A Novel Method Based Solely on FPGA Units Enabling Measurement of Time and Charge of Analog Signals in Positron Emission Tomography," 2014.
Raismian, "Google Cars Autonomous Driving," 2017.

(56) References Cited

OTHER PUBLICATIONS

Schwarze, "A New Look at Risley Prisms," 2006.
Tongtong, et al., "Gaussian-Process-Based Real-Time Ground Segmentation for Autonomous Land Vehicles," 2014.
Wu, et al., "Several Key Issues on Implementing Delay Line Based TDCs using FPGA," 2009.
Zhang et al., "LOAM: Lidar Odometry and Mapping in Real-Time," Robotics Science and Systems., vol. 2., 2014.
Gao et al., "On-line Calibration of Multiple LIDARs on a Mobile Vehicle Platform," 2010 IEEE International Conference on Robotics and Automation, May 3, 2010, pp. 279-284.
Gao et al., "Towards Autonomous Wheelchair Systems in Urban Environments," Springer Tracts in Advanced Robotics, Jan. 2009, pp. 1-10.
Yoon et al., "LADAR based Obstacle Detection in an Urban Environment and its Application in the DARPA Urban Challenge," International Conference on Control, Automation and Systems, Oct. 14, 2008, pp. 581-585.

\* cited by examiner

CALIBRATION OF LASER SENSORS

CROSS REFERENCE TO RELATED APPLICATIONS

The present application is a continuation of U.S. patent application Ser. No. 15/730,572, filed Oct. 11, 2017, which is a continuation of International Patent Application No. PCT/CN17/82584, filed Apr. 28, 2017, and which is incorporated herein by reference.

TECHNICAL FIELD

The presently disclosed technology is generally directed to calibration of emitter/detector sensors, such as laser sensors, that are carried by mobile platforms.

BACKGROUND

Laser sensors, such as LiDAR sensors, typically transmit a pulsed laser signal outwards, detect the pulsed signal reflections, and measure three-dimensional information (e.g., laser scanning points) in the environment to facilitate environment mapping. To accomplish precise mapping of an environment that surrounds a mobile platform, an omni-directional laser sensor with 360-degree horizontal field of view (FOV) is typically mounted on the mobile platform to constantly scan its surroundings. Omni-directional laser sensors are typically expensive, non-customizable, and have a limited vertical FOV. Accordingly, there remains a need for improved sensing techniques and devices for mobile platforms.

SUMMARY

The following summary is provided for the convenience of the reader and identifies several representative embodiments of the presently disclosed technology.

In some embodiments, a computer-implemented method for automatically calibrating at least a first emitter/detector unit and a second emitter/detector unit both carried by a common mobile platform includes transforming point cloud information obtained from the first emitter/detector unit into a first point cloud in a reference system associated with the mobile platform; transforming point cloud information obtained from the second emitter/detector unit into a second point cloud in the reference system associated with the mobile platform; determining an overlapping region between the first and second point clouds; comparing surface attributes of the first and second point clouds in the overlapping region; and generating at least one calibration rule for calibration between the first and second emitter/detector units based at least in part on comparing the surface attributes. In some embodiments, transforming point cloud information obtained from the first emitter/detector unit is based at least in part on a first set of transformation rules, which is at least partially defined in accordance with a position and orientation of the first emitter/detector unit relative to the mobile platform. In some embodiments, the reference system associated with the mobile platform comprises a coordinate system. In some embodiments, the first set of transformation rules comprises a transform matrix. In some embodiments, the first emitter/detector unit includes at least one laser sensor that has a field of view (FOV) smaller than at least one of 360 degrees, 180 degrees, 90 degrees, or 60 degrees. In some embodiments, the first emitter/detector unit includes a plurality of laser sensors rigidly fixed relative to each other. In some embodiments, determining an overlapping region comprises determining at least a nearest neighbor in the second point cloud for at least one point in the first point cloud. In some embodiments, determining an overlapping region comprises creating a tree-structured data structure for at least one of the first or second point clouds. In some embodiments, comparing surface attributes comprises matching a surface associated with the first point cloud with a surface associated with the second point. In some embodiments, comparing surface attributes further comprises evaluating a target function defined at least in part by a plurality of points of the first and second point clouds that are within the overlapping region. In some embodiments, generating at least one calibration rule comprises optimizing the target function. In some embodiments, the at least one calibration rule comprises a rule for transformation between coordinate systems of the first emitter/detector unit and the second emitter/detector unit. In some embodiments, the computer-implemented method further includes detecting a difference between the generated at least one calibration rule against one or more previously generated calibration rules. In some embodiments, the computer-implemented method further includes causing calibration of the first and second emitter/detector units in accordance with the at least one calibration rule.

In other embodiments, a non-transitory computer-readable medium stores computer-executable instructions. The instructions, when executed, cause one or more processors associated with a mobile platform to perform actions including: transforming point cloud information obtained from a first emitter/detector unit into a first point cloud in a reference system associated with the mobile platform; transforming point cloud information obtained from a second emitter/detector unit into a second point cloud in the reference system associated with the mobile platform; determining an overlapping region between the first and second point clouds; comparing surface attributes of the first and second point clouds in the overlapping region; and generating at least one calibration rule for calibration between the first and second emitter/detector units based at least in part on comparing the surface attributes. In some embodiments, transforming point cloud information obtained from the first emitter/detector unit is based at least in part on a first set of transformation rules, which is at least partially defined in accordance with a position and orientation of the first emitter/detector unit relative to the mobile platform. In some embodiments, the reference system associated with the mobile platform comprises a coordinate system. In some embodiments, the first set of transformation rules comprises a transform matrix. In some embodiments, the first emitter/detector unit includes at least one laser sensor that has a field of view (FOV) smaller than at least one of 360 degrees, 180 degrees, 90 degrees, or 60 degrees. In some embodiments, the first emitter/detector unit includes a plurality of laser sensors rigidly fixed relative to each other. In some embodiments, determining an overlapping region comprises determining at least a nearest neighbor in the second point cloud for at least one point in the first point cloud. In some embodiments, determining an overlapping region comprises creating a tree-structured data structure for at least one of the first or second point clouds. In some embodiments, comparing surface attributes comprises matching a surface associated with the first point cloud with a surface associated with the second point. In some embodiments, comparing surface attributes further comprises evaluating a target function defined at least in part by a plurality of points of the first and second point clouds that are within the overlapping region. In some embodiments, generating at least one calibration rule comprises optimizing the target function. In some embodiments, the at least one calibration rule comprises a rule for transformation between coordinate systems of the first emitter/detector unit and the second emitter/detector unit. In some embodiments, the actions further include detecting a difference between the generated at least one calibration rule against one or more previously generated calibration rules. In some embodiments, the actions further include causing calibration of the first and second emitter/detector units in accordance with the at least one calibration rule.

In still further embodiments, a vehicle includes a programmed controller that at least partially controls one or more motions of the vehicle. The programmed controller includes one or more processors that are configured to: transform point cloud information obtained from a first emitter/detector unit into a first point cloud in a reference system associated with the vehicle; transform point cloud information obtained from a second emitter/detector unit into a second point cloud in the reference system associated with the vehicle; determine an overlapping region between the first and second point clouds; compare surface attributes of the first and second point clouds in the overlapping region; and generate at least one calibration rule for calibration between the first and second emitter/detector units based at least in part on the comparison of surface attributes. In some embodiments, transforming point cloud information obtained from the first emitter/detector unit is based at least in part on a first set of transformation rules, which is at least partially defined in accordance with a position and orientation of the first emitter/detector unit relative to the vehicle. In some embodiments, transforming point cloud information obtained from the second emitter/detector unit is based at least in part on a second set of transformation rules and wherein the second set of transformation rules differs from the first set of transformation rules. In some embodiments, the first set of transformation rules comprises a transform matrix. In some embodiments, the first emitter/detector unit includes a plurality of laser sensors rigidly fixed relative to each other. In some embodiments, determining an overlapping region comprises determining at least a nearest neighbor in the second point cloud for at least one point in the first point cloud. In some embodiments, comparing surface attributes comprises matching a surface associated with the first point cloud with a surface associated with the second point, and matching a surface associated with the first point cloud with a surface associated with the second point comprises determining normal vector information with respect to at least a portion of the first point cloud. In some embodiments, comparing surface attributes further comprises evaluating a target function defined at least in part by a plurality of points of the first and second point clouds that are within the overlapping region, wherein the target function comprises a rotational component and a translational component. In some embodiments, the at least one calibration rule comprises a rule for transformation between coordinate systems of the first emitter/detector unit and the second emitter/detector unit. In some embodiments, the one or more processors are further configured to detect a difference between the generated at least one calibration rule against one or more previously generated calibration rules. In some embodiments, the vehicle includes at least one of an unmanned aerial vehicle (UAV), a manned aircraft, an autonomous car, a self-balancing vehicle, or a robot. In some embodiments, the one or more processors are further configured to cause calibration of the first and second emitter/detector units in accordance with the at least one calibration rule.

In yet still further embodiments, a computer-implemented method for automatically detecting disturbance to an emitter/detector unit carried by a mobile platform includes transforming first point cloud information into a first point cloud in a reference system associated with the mobile platform, the first point cloud information obtained from the emitter/detector unit at a first point in time; transforming second point cloud information into a second point cloud in the reference system associated with the mobile platform, the second point cloud information obtained from the emitter/detector unit at a second point in time; determining an overlapping region between the first and second point clouds; comparing surface attributes of the first and second point clouds in the overlapping region; and detecting a disturbance to the emitter/detector unit based at least in part on comparing the surface attributes. In some embodiments, transforming first point cloud information obtained from the emitter/detector unit is based at least in part on a set of transformation rules, which is at least partially defined in accordance with a position and orientation of the emitter/detector unit relative to the mobile platform. In some embodiments, the reference system associated with the mobile platform comprises a coordinate system. In some embodiments, the reference system associated with the mobile platform corresponds to a reference system at the first point in time. In some embodiments, the set of transformation rules comprises a transform matrix. In some embodiments, the emitter/detector unit includes at least one laser sensor that has a field of view (FOV) smaller than at least one of 360 degrees, 180 degrees, 90 degrees, or 60 degrees. In some embodiments, the emitter/detector unit includes a plurality of laser sensors rigidly fixed relative to each other. In some embodiments, determining an overlapping region comprises determining at least a nearest neighbor in the second point cloud for at least one point in the first point cloud. In some embodiments, determining an overlapping region comprises creating a tree-structured data structure for at least one of the first or second point clouds, wherein the tree-structured data structure comprises a K-Dimensional (KD) tree data structure. In some embodiments, comparing surface attributes comprises matching a surface associated with the first point cloud with a surface associated with the second point, wherein matching a surface associated with the first point cloud with a surface associated with the second point comprises determining normal vector information with respect to at least a portion of the first point cloud. In some embodiments, comparing surface attributes further comprises evaluating a target function defined at least in part by a plurality of points of the first and second point clouds that are within the overlapping region, wherein the target function comprises a rotational component and a translational component. In some embodiments, detecting a disturbance to the emitter/detector unit comprises optimizing a target function based at least in part on a least squares method. In some embodiments, detecting a disturbance to the emitter/detector unit further comprises generating at least one rule for transformation between the first point cloud and the second point cloud. In some embodiments, the mobile platform includes at least one of an unmanned aerial vehicle (UAV), a manned aircraft, an autonomous car, a self-balancing vehicle, a robot, a smart wearable device, a virtual reality (VR) head-mounted display, or an augmented reality (AR) head-mounted display. In some embodiments, the computer-implemented method further includes issuing a warning in response to detecting the disturbance to the emitter/detector unit.

DETAILED DESCRIPTION

1. Overview

Figure 1A:
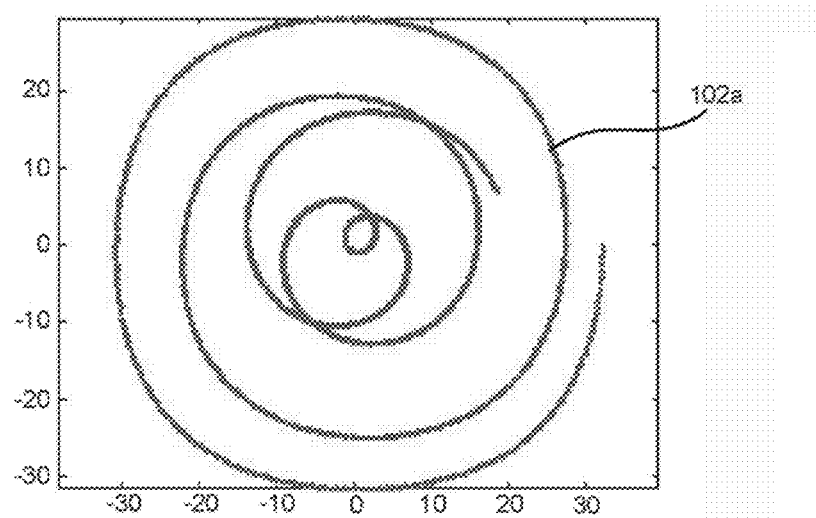
FIG. 1A illustrates a scanning pattern of a laser sensor that can be utilized in accordance with some embodiments of the presently disclosed technology.

To achieve accurate and comprehensive environment mapping while overcoming the deficiencies associated with omni-directional laser sensors, multiple laser sensors can be used (e.g., strategically affixed to a mobile platform) to enable wider horizontal field of view (FOV) coverage, omni-directional horizontal coverage, partial or complete spherical coverage, or any other suitable customized coverage of the surrounding environment. Laser sensors with limited FOV can be significantly cheaper than omni-directional laser sensors and as used herein typically refer to laser sensors with a horizontal FOV smaller than 360 degrees, 180 degrees, 90 degrees, or 60 degrees. Due to the multiplicity of sensors that are typically used to achieve the desired angular coverage, proper calibration between sensors is used to accurately align of point cloud data generated by different sensors, thereby providing a meaningful and reliable mapping of the surrounding environment. Incorrect calibration between the sensors can distort the alignment of point clouds, cause errors in environment mapping, and thus bring about undesirable changes to the navigation, movement, and/or other functions of the mobile platform. Furthermore, when the mobile platform is actively deployed, external vibration or other disturbances may cause changes in the position or orientation of originally fixed sensors, therefore causing calibration errors. Accordingly, detecting such changes accurately in real time can further contribute to the reliability and safety of the mobile platform.

The technology disclosed herein is generally directed to calibrating and/or detecting errors in laser sensors carried by a mobile platform. As will be discussed in further detail below, some embodiments of the presently disclosed technology include a multi-laser calibration method that accounts for at least: 1) limitations to the FOV of the laser sensors; and 2) the desire or requirement for omni-directional, spherical, and/or other customizable coverage via a multi-laser system. In some embodiments, the presently disclosed technology uses individual laser units each including multiple fixed laser sensors to reduce the number of calibrations within the system. In some embodiments, the presently disclosed technology utilizes a method for detecting a common overlapping region between the point clouds generated by at least two laser sensors or units, as well as surface matching or comparison of the point clouds within the overlapping region, to generate rules for high precision calibration rules for laser sensors or units.

Several details describing structures or processes that are well-known and often associated with mobile platforms (e.g., UAVs or other types of movable objects) and corresponding systems and subsystems, but that may unnecessarily obscure some significant aspects of the presently disclosed technology, are not set forth in the following description for purposes of clarity. Moreover, although the following disclosure sets forth several embodiments of different aspects of the presently disclosed technology, several other embodiments can have different configurations or different components than those described herein. Accordingly, the presently disclosed technology may have other embodiments with additional elements and/or without several of the elements described below with reference to FIGS. 1-16.

FIGS. 1-16 are provided to illustrate representative embodiments of the presently disclosed technology. Unless provided for otherwise, the drawings are not intended to limit the scope of the claims in the present application.

Many embodiments of the technology described below may take the form of computer- or controller-executable instructions, including routines executed by a programmable computer or controller. The programmable computer or controller may or may not reside on a corresponding mobile platform. For example, the programmable computer or controller can be an onboard computer of the mobile platform, or a separate but dedicated computer associated with the mobile platform, or part of a network or cloud based computing service. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and handheld devices (including palmtop computers, wearable computers, cellular or mobile phones, multi-processor systems, processor-based or programmable consumer electronics, network computers, mini computers and the like). Information handled by these computers and controllers can be presented at any suitable display medium, including an LCD (liquid crystal display). Instructions for performing computer- or controller-executable tasks can be stored in or on any suitable computer-readable medium, including hardware, firmware or a combination of hardware and firmware. Instructions can be contained in any suitable memory device, including, for example, a flash drive, USB (universal serial bus) device, and/or other suitable medium.

2. Representative Embodiments

Figure 1B:
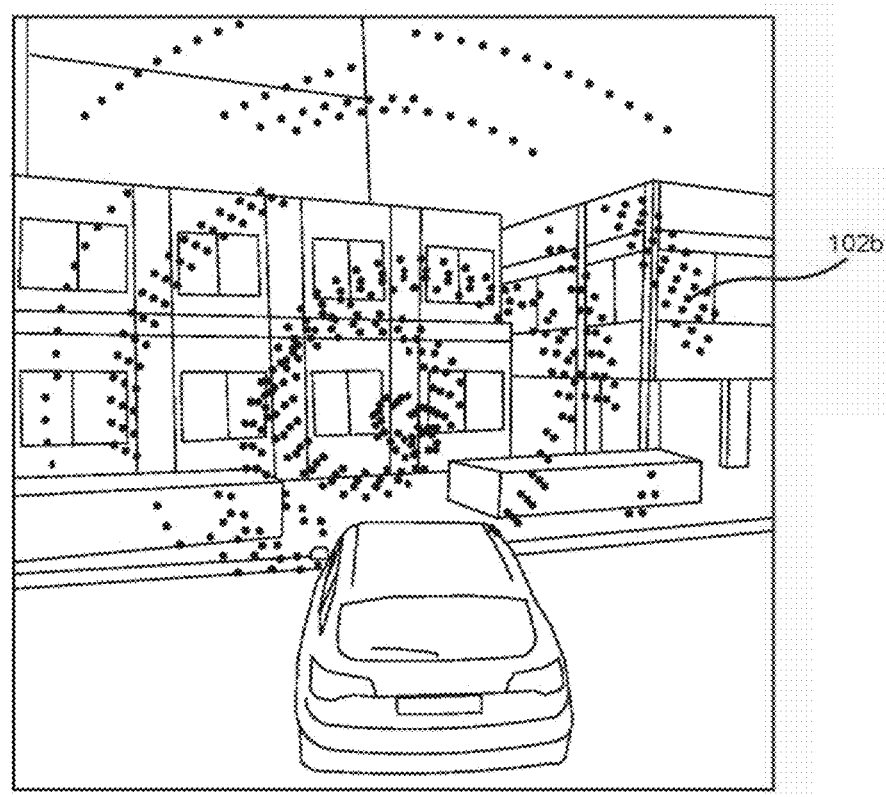
FIG. 1B illustrates a three-dimensional point cloud generated by a laser sensor in accordance with some embodiments of the presently disclosed technology.

FIG. 1A illustrates a scanning pattern 102 a of a laser sensor that can be utilized in accordance with some embodiments of the presently disclosed technology. As illustrated in FIG. 1A, the FOV of the laser sensor is limited (e.g., no larger than 60 degrees in both horizontal and vertical directions). FIG. 1B illustrates a three-dimensional point cloud generated by a laser sensor (e.g., the laser sensor illustrated in FIG. 1A). Compared with a conventional omni-directional laser sensor, a laser sensor with limited FOV cannot provide a uniformly-distributed, 360-degree three-dimensional point cloud, but may provide denser or sparser scanning points in certain portions of its FOV (e.g., a higher density of points in a forward area of the sensor FOV as illustrated in FIG. 1B).

Figure 2:
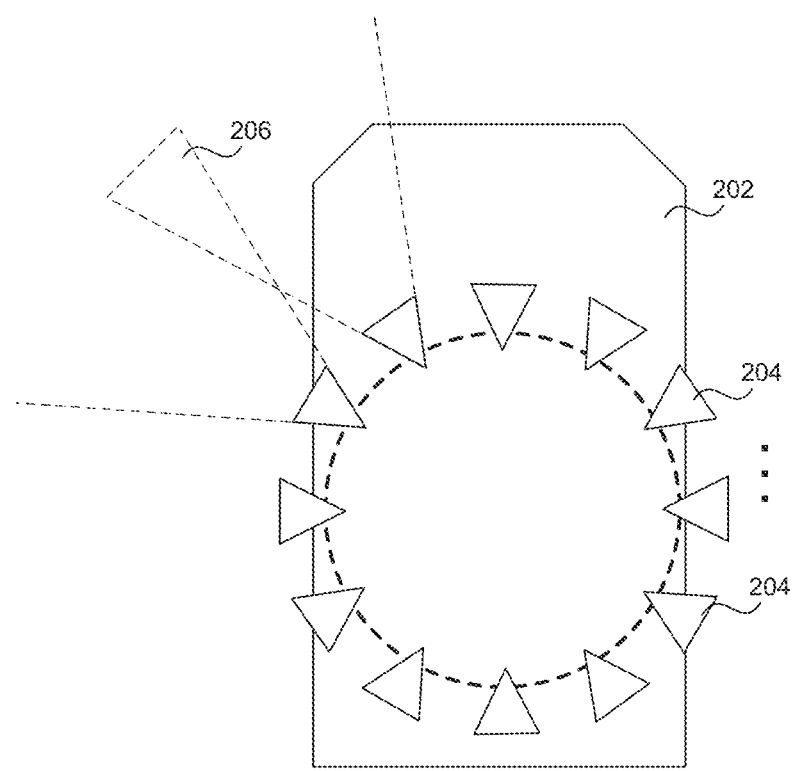
FIG. 2 illustrates a layout of multiple laser sensors carried by a mobile platform to achieve wide angle (e.g., omnidirectional) horizontal field of view (FOV) coverage in accordance with some embodiments of the presently disclosed technology.

FIG. 2 illustrates a layout of multiple laser sensors 204 carried by a mobile platform 202 to achieve wide angle (e.g., omni-directional) horizontal FOV coverage in accordance with some embodiments of the presently disclosed technology. The laser sensors 204 can be distributed and/or oriented differently to achieve wide angle FOV coverage, partial or complete spherical coverage, as well as other customizable FOV coverage. In the illustrative layout of FIG. 2, depending on the FOV of each laser sensor 204, the overlapping region 206 between the FOVs of two neighboring sensors 204 may be limited, which may provide insufficient or inadequate geometrical information for high-resolution calibrations. In addition, depending on the quantity of laser sensors 204 needed to achieve a wide angle coverage, the number of calibrations between sensors can be significant. For example, even if only a pairwise calibration between neighboring sensors 204 is to be performed, at least twelve set of calibration rules need to be determined for the layout shown in FIG. 2.

The presently disclosed technology can: 1) achieve an overlapping region of an adequate size (e.g., exceeding a threshold of overlapped FOVs) between sensors; 2) strategically distribute and orient multiple sensors with respect to the mobile platform to achieve wide angle (e.g., omni-directional), spherical, and/or other customizable coverage; and/or 3) reduce the number of laser sensors utilized. In this regard, FIG. 3 illustrates a laser unit 300 that includes multiple laser sensors 302, 304, and 306 that can be used in accordance with some embodiments of the presently disclosed technology.

Figure 3:
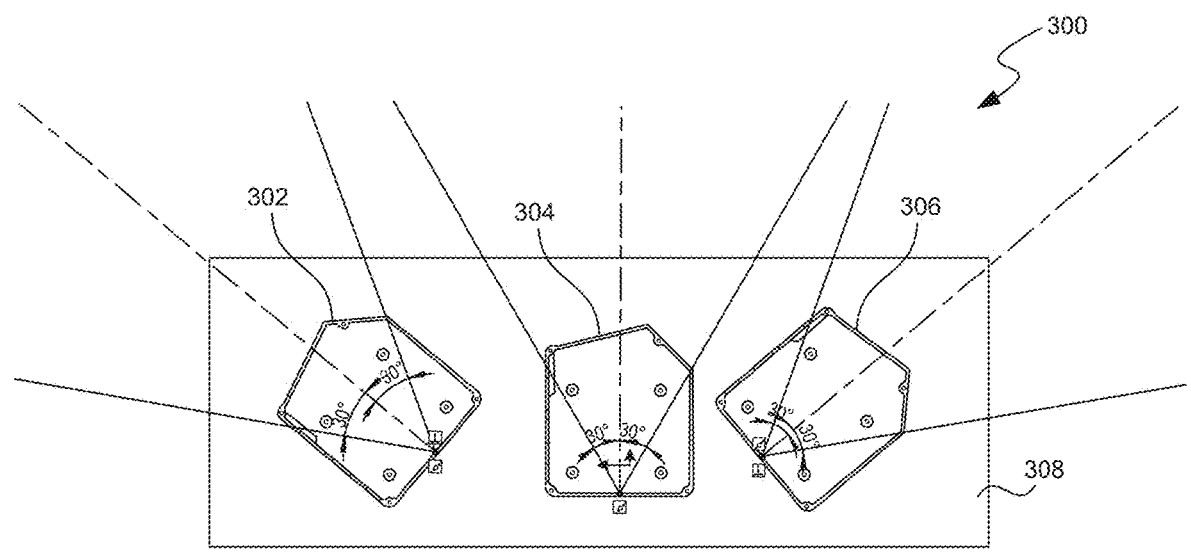
FIG. 3 illustrates a laser unit including multiple laser sensors that can be utilized in accordance with some embodiments of the presently disclosed technology.

With reference to FIG. 3, the laser unit 300 may include a mechanical structure 308 (e.g., a metal frame) to which two or more laser sensors with a limited FOV are rigidly or fixedly connected (e.g., welded to a metal frame) at a certain position and orientation with respect to one another. In some embodiments, the mechanical structure 308 may correspond to a part of a mobile platform. In the embodiment as illustrated in FIG. 3, three laser sensors 302, 304, and 306 are positioned and oriented in a manner that expands a 60-degree horizontal FOV coverage for each sensor to approximately 160 degrees of horizontal FOV for the laser unit 300. Illustratively, angles between neighboring laser units can be set to 50 degrees to allow for suitable FOV overlap.

The calibration rules for calibrating between or among laser sensors within a laser unit 300 can be known and fixed. For example, laser sensors within one laser unit 300 may be pre-calibrated with respect to each other manually, using the same calibration technology as disclosed herein, or based on calibration methods known to those of skill in the relevant art. As discussed above, the relative positions and orientations of the multiple laser sensors are unlikely to change within a laser unit 300. Therefore, based on the pre-calibration, the laser unit 300 can consistently generate or otherwise output point cloud data that covers a wider FOV than each constituent laser sensor.

Figure 4:
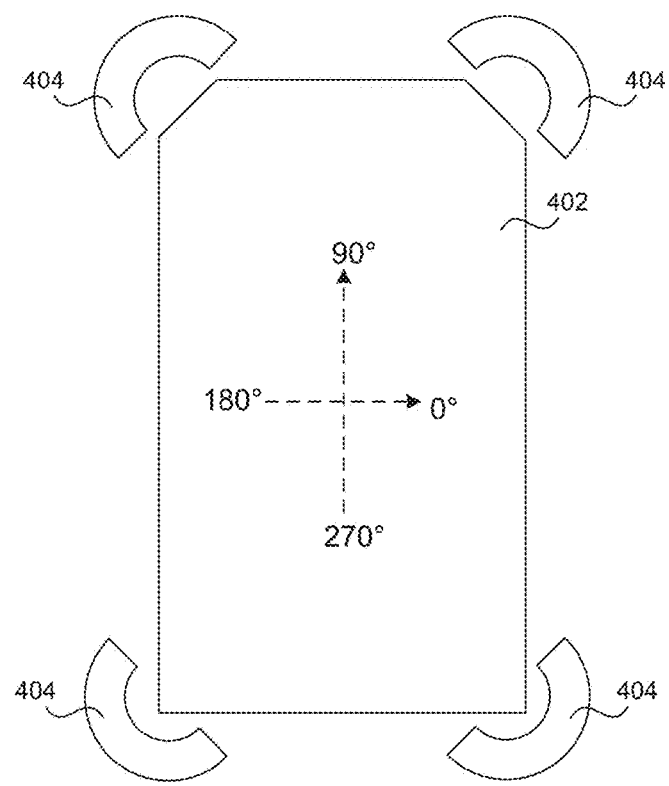
FIG. 4 illustrates a layout of multiple laser units carried by a mobile platform to achieve wide angle (e.g., omni-directional) horizontal FOV coverage in accordance with some embodiments of the presently disclosed technology.

FIG. 4 illustrates a layout of multiple laser units 404 carried by a mobile platform 402 to achieve wide angle (e.g., omni-directional) horizontal FOV coverage in accordance with some embodiments of the presently disclosed technology. Each laser unit 404 may have a configuration like that of the laser unit 300 illustrated in FIG. 3. The laser units 404 (possibly in combination with laser sensors 204 described above with reference to FIG. 2) can be distributed and/or oriented differently to achieve wide angle FOV coverage, partial or complete spherical coverage, as well as other customizable FOV coverage. With reference to FIG. 4, four laser units 404 are distributed and oriented in four respective directions, e.g., at 45 degrees, 135 degrees, 225 degrees, and 315 degrees in accordance with a coordinate system centered on the mobile platform 402. As discussed earlier, laser sensors within individual laser units 404 are fixed relative to each other. Therefore the number of calibrations (e.g., between laser units 404) is reduced as compared to the configuration of FIG. 2. For example, if only pairwise calibrations between neighboring laser units 404 are to be performed, only four sets of calibration rules need to be determined. At the same time, an overlapping region between FOVs of neighboring laser units 404 can be large enough to provide sufficient geometrical information to enhance the precision of the calibration between the laser units 404.

Figure 5:
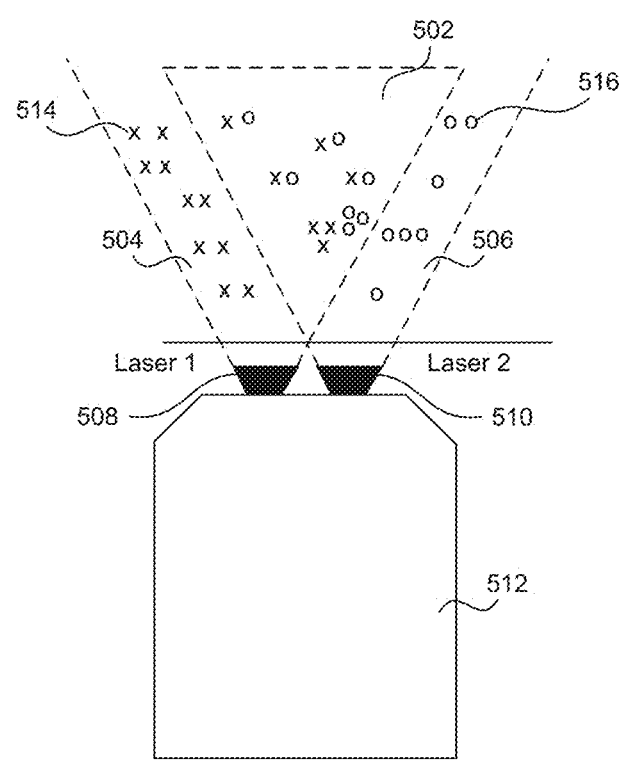
FIG. 5 illustrates a mobile platform with two laser units (or laser sensors) with overlapping FOVs in accordance with some embodiments of the presently disclosed technology.

FIG. 5 illustrates a mobile platform 512 with first and second laser units (or laser sensors) 508 and 510 with corresponding FOVs 504 and 506 that overlap, in accordance with some embodiments of the presently disclosed technology. As illustrated in FIG. 5, the two laser units 508 and 510 are arranged in a forward-looking manner and a relative distance between them is limited to provide an overlapping region 502 of adequate size. In other embodiments, the laser units or sensors can be arranged in different manners to provide adequately sized overlapping regions. With reference to FIG. 5, illustratively, a set of indicators "x" represents a point cloud 514 generated by the first laser unit 508 and a set of indicators "o" represents a point cloud 516 generated by the second laser unit 510.

With continued reference to FIG. 5, the mobile platform 512 can be associated with a coordinate system $F^r$, the first laser unit 508 can be associated with a coordinate system $F_1^l$, and the second laser unit 510 can be associated with a coordinate system $F_2^l$. Initial transformation matrices for transforming coordinates between the mobile platform coordinate system $F^r$ and the laser unit coordinate systems $F_1^l$ and $F_2^l$ can be expressed as $_rT_{l_1}$ and $_rT_{l_2}$, respectively. In some embodiments, the initial transformation matrices can be determined prior to deploying the mobile platform, for example, in accordance with the position and orientation of the respective laser units relative to the mobile platform. Suitable manual or semi-automatic calibration methods known to those of skill in the relevant art may be used to determine the initial transformation matrices. In some embodiments, the transformation matrices are all homogeneous matrices of a 4×4 size. In some embodiments, an initial transformation matrix $_{l_1}T_{l_2}$ for transforming directly between coordinate systems of the first and second laser units 508 and 510 can be determined prior to deploying the mobile platform as well, for example, based on the values of $_rT_{l_1}$ and $_rT_{l_2}$.

Figure 6:
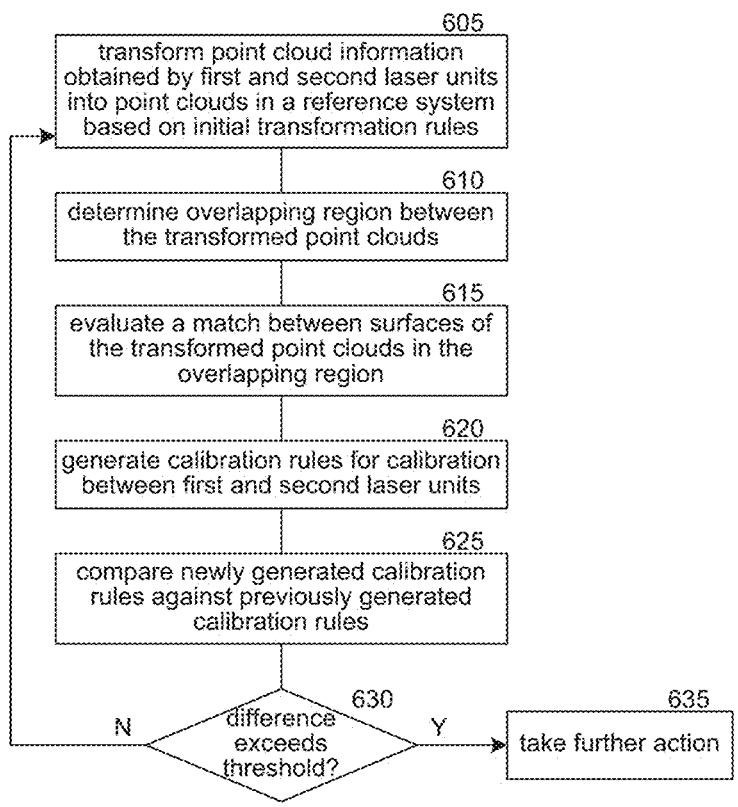
FIG. 6 illustrates a calibration process for two laser units (or laser sensors) in accordance with some embodiments of the presently disclosed technology.

FIG. 6 illustrates a calibration process for two laser units (or laser sensors) in accordance with some embodiments of the presently disclosed technology. The calibration process of FIG. 6 can be implemented by a controller (e.g., an onboard computer of a mobile platform, an associated computing device, and/or an associated computing service). In step 605, the process includes transforming point cloud information obtained by the two laser units into point clouds in a reference system based on initial transformation rules. For example, laser point clouds 514 and 516 are captured by the two laser units 508 and 510 in accordance with their corresponding coordinate systems $F_1^l$ and $F_2^l$, respectively. The laser point clouds 514 and 516 can be projected into the coordinate system $F^r$ of the mobile platform 512 to form corresponding first and second transformed point clouds $C_1^r$ and $C_2^r$, based on initial transformation matrices $_rT_{l_1}$ and $_rT_{l_2}$, respectively.

In step 610, the process includes determining an overlapping region between the transformed point clouds in the reference system. Illustratively, assuming the initial transformation matrices $_rT_{l_1}$ and $_rT_{l_2}$ are properly determined (e.g., close to their truth values), the surface shapes of transformed point clouds $C_1^r$ and $C_2^r$ within the overlapping region should not deviate significantly from each other. Illustratively, the controller sets up K-Dimensional (KD) tree structures $t_1^r$ and $t_2^r$, respectively, according to the two point clouds $C_1^r$ and $C_2^r$ projected to the coordinate system of the mobile platform 512. By using this type of tree structure, for any point of the first point cloud $C_1^r$, the nearest neighbor in the second point cloud $C_2^r$ can be retrieved quickly, and vice versa. If a distance between a query point in the first point cloud (e.g., $C_1^r$) and its nearest neighbor in the second point cloud (e.g., $C_2^r$) is less than a specified threshold, the process can include labeling or classifying the query point as being located in the overlapping region. The process can identify all query points in either or both point clouds $C_1^r$ and $C_2^r$ that satisfy the threshold requirement, thus determining the overlapping region.

In step 615, the process includes evaluating a match between surfaces of the transformed point clouds in the overlapping region. Illustratively, for each point of a specific transformed point cloud (e.g., $C_1^r$) in the overlapping region, the nearest neighbor thereof in the specific point cloud can also be quickly retrieved by using the corresponding KD tree structure (e.g., $t_1^r$) that was set up in step 610. Accordingly, for each point of the specific transformed point cloud, a specified number of (nearest) neighbor points can be selected to form a plane, from which a normal vector corresponding to the point can be readily determined.

In some embodiments, to match surfaces represented or indicated by the point clouds in the overlapping region, the controller may implement a Point-to-Plane Iterative Closest Point (Point-to-Plane ICP) method. Illustratively, after the overlapping region is found and the normal vectors for at least one point cloud within the overlapping region are determined, the controller can use the Point-To-Plane ICP method to minimize the following target function:

$$E = \sum_i ((Rp_i + t - q_i) \cdot n_i)^2$$

where $p_i$ denotes a point within the overlapping region of the first point cloud $C_1^r$, $q_i$ denotes a nearest point within the overlapping region of the second point cloud $C_2^r$, R denotes a rotation matrix, t denotes a translation vector, and $n_i$ denotes a normal vector with respect to $p_i$. When an adequate number of points (e.g., exceeding a threshold number) are available in the overlapping region, the minimization can be achieved based, for example, on a least squares method.

In step 620, the process includes generating calibration rules for calibration between the two laser units or sensors. Illustratively, when the target function is minimized, an optimal solution of transformation (e.g., optimal values for rotation matrix R and translation vector t) is achieved. In some embodiments, a translational change between the laser units or sensors is less likely to occur because different laser units or sensors are fixedly connected (e.g., via brackets). However, the laser units or sensors may be more likely to rotate, for example, if they are connected to the brackets by screws. In these embodiments, the translation vector t can be fixed to a constant (e.g., a value determined based on a prior minimization of the target function), so that the controller may estimate the rotational matrix R more efficiently. In some embodiments, after the calibration rules are generated, the controller calibrates the two laser units or sensors based thereon. Illustratively, the controller may align point clouds generated from the two laser units or sensors using the rotational matrix rotation matrix R and translation vector t, until they are updated in a next round of calibration.

In step 625, the process includes comparing newly generated calibration rules against previously generated calibrations rules. Illustratively, the onboard computer may compare newly determined optimal values for the rotation matrix R and/or the translation vector t against their optimal values determined in an initial round of calibration, a most recent round of calibration, an average or weighted average of several recent rounds, or the like. In step 630, the process includes determining whether the difference that results from the comparison in step 625 exceeds a threshold. If not, the process proceeds to step 605 for a new round of calibration. If the difference exceeds the threshold, the process proceeds to step 635.

In step 635, the process includes taking one or more further actions. The difference exceeding the threshold may indicate that the two laser units or sensors cannot be reliably calibrated with each other. For example, the physical position or orientation of at least one of the laser units or sensors may have deviated substantially from a preset configuration. In this case, the controller may issue a warning to an operator of the mobile platform. Alternatively, the controller may suspend the navigation or other functions of the mobile platform in a safe manner.

Figure 7A:
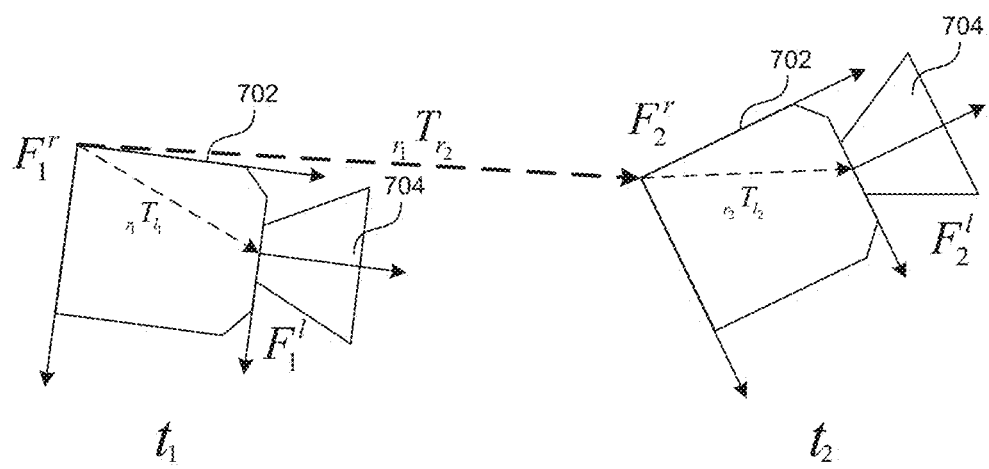
FIG. 7A illustrates movement of a mobile platform from a first point in time to a second point in time, in accordance with some embodiments of the presently disclosed technology.

FIG. 7A illustrates the movement of a mobile platform 702 between a first point in time $t_1$ and a second point in time $t_2$, in accordance with some embodiments of the presently disclosed technology. Illustratively, a transformation matrix $_{r_1}T_{r_2}$ for transforming between the mobile platform's coordinate system $F_1^r$ at time $t_1$ and the mobile platform's coordinate system $F_2^r$ at time $t_2$ is known or can be determined, for example, based on measurements collected by a global positioning system and/or an inertial measurement unit carried by the mobile platform 702. Based on a known transformation relationship (e.g., the transformation matrix $_{r_1}T_{r_2}$) between the mobile platform's two positions at two different points in time, representative systems can detect disturbances to and/or calibrate the transformation between the coordinate systems of a single laser unit (or laser sensor) 704 and the mobile platform body can be achieved.

Figure 7B:
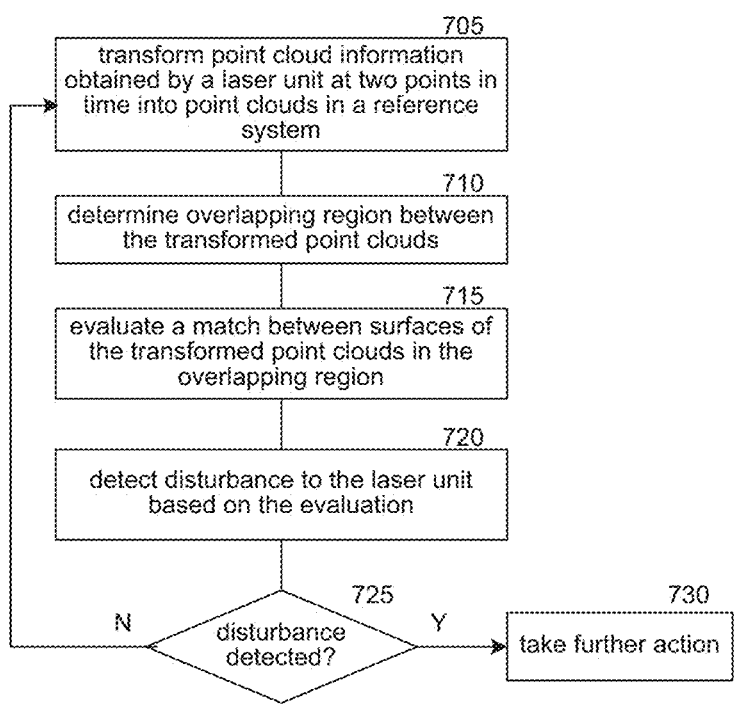
FIG. 7B illustrates a process for detecting disturbance to a laser unit in accordance with some embodiments of the presently disclosed technology.

FIG. 7B illustrates a process for detecting disturbance to a laser unit (e.g., the laser unit 704 carried by the mobile platform 702 as illustrated in FIG. 7A) in accordance with some embodiments of the presently disclosed technology. The process can be implemented by a controller (e.g., an onboard computer of the mobile platform, an associated computing device, and/or an associated computing service). The FOVs of the laser unit 704 at times $t_1$ and $t_2$ may have a sufficiently large overlapping region to facilitate a disturbance detection process similar to the calibration process described above with reference to FIG. 6. Similar to generating calibration rules for calibration between two different laser units, the process of FIG. 6 can be modified to generate calibration rules for calibration of a single laser unit at two points in time (or two positions/orientations), and to detect disturbances to the laser unit based thereon.

Step 705 of the disturbance detection process includes transforming point cloud information obtained by the laser unit at two points in time into respective point clouds in a reference system. Illustratively, given (1) the transformation matrix $_{r_1}T_{r_2}$ of the mobile platform 702 between two times $t_1$ and $t_2$, (2) initial values for a transformation matrix $_{r_1}T_{l_1}$ between the mobile platform coordinate system $F_1^r$ and the laser unit coordinate system $F_1^l$ at time $t_1$, and (3) initial values for a transformation matrix $_{r_2}T_{l_2}$ between the mobile platform coordinate system $F_2^r$ and the laser unit coordinate system $F_2^l$ at moment $t_2$, the controller can project point clouds collected by the laser unit 704 at the two times, $t_1$ and $t_2$, to the mobile platform's coordinate system $F_1^r$ at time $t_1$. As discussed earlier, the initial values for a transformation matrix between the mobile platform and the laser unit can be known or pre-determined in accordance with the position and orientation of the laser unit relative to the mobile platform. Suitable manual or semi-automatic calibration methods known to those of skill in the relevant art may be used to determine the initial transformation matrix, for example, prior to deploying the mobile platform. Accordingly, in some embodiments, the initial values for $_{r_1}T_{l_1}$ and $_{r_2}T_{l_2}$ may be the same.

Step 710 of the disturbance detection process includes determining an overlapping region between the transformed point clouds. Illustratively, the projected point clouds can be expressed as $_{r_1}P_1$ (for time $t_1$) and $_{r_1}P_2$ (for time $t_2$), wherein theoretically $_{r_1}P_2 =\,_{r_1}T_{r_2}P_2$. Similar to the calibration process of FIG. 6, the controller may set up KD tree structures for both projected point clouds and determine their respective subsets of points in an overlapping region: $_{r_1}\hat{P}_1$ and $_{r_1}\hat{P}_2$, respectively.

Step 715 of the disturbance detection process includes evaluating a match between surfaces indicated or represented by the transformed point clouds in the overlapping region. Illustratively, similar to the calibration process of FIG. 6, the controller may compare the surfaces of the two projected point clouds within the overlapping region. After the controller estimates normal vectors $n_{1,i}$ for each point within $_{r_1}\hat{P}_1$, the controller may evaluate the following target function:

$$H = \sum_i ((Rp_{1,i} + t - p_{2,i}) \cdot n_{1,i})^2$$

wherein $p_{1,i} \in\,_{r_1}\hat{P}_1$, $p_{2,i} \in\,_{r_1}\hat{P}_2$.

Step 720 of the disturbance detection process includes detecting whether there is disturbance to the laser unit. Illustratively, the controller can minimize the target function H, for example, based on a least squares method. If the minimized value of function H exceeds a threshold, or if the rotational matrix R and/or the translation vector t exceed or deviate from a certain threshold (e.g., with respect to $_{r_1}T_{r_2}$), in step 725 of the process, the controller can determine that the laser unit 704 has been disturbed between times $t_1$ and $t_2$ (e.g., due to a loosened screw or impact by an external object). In this case, the process proceeds to step 730 where the one or more further actions can be taken. For example, the controller may issue a warning to an operator of the mobile platform 702 and/or take other actions. If no disturbance is detected in step 725, the process proceeds to step 705. Similar to the calibration process of FIG. 6, this disturbance detection process using the coordinate systems of a single laser unit and the mobile platform body can be performed repeatedly and periodically while the mobile platform is deployed.

In the use of certain laser units or sensors, the number and/or distribution of laser scanning points in a single frame may not provide a sufficiently dense point cloud to facilitate calibration, mapping, object detection, and/or positioning. This problem may be particularly apparent in the use of low-cost small-angle LiDAR sensors. For example, for a typical low-cost small-angle LiDAR, the number of laser points in a single frame can be fewer than 4000 or even 2000, whereas a more expensive omni-directional LiDAR may produce 288000 laser scanning points in a single frame.

Figure 8:
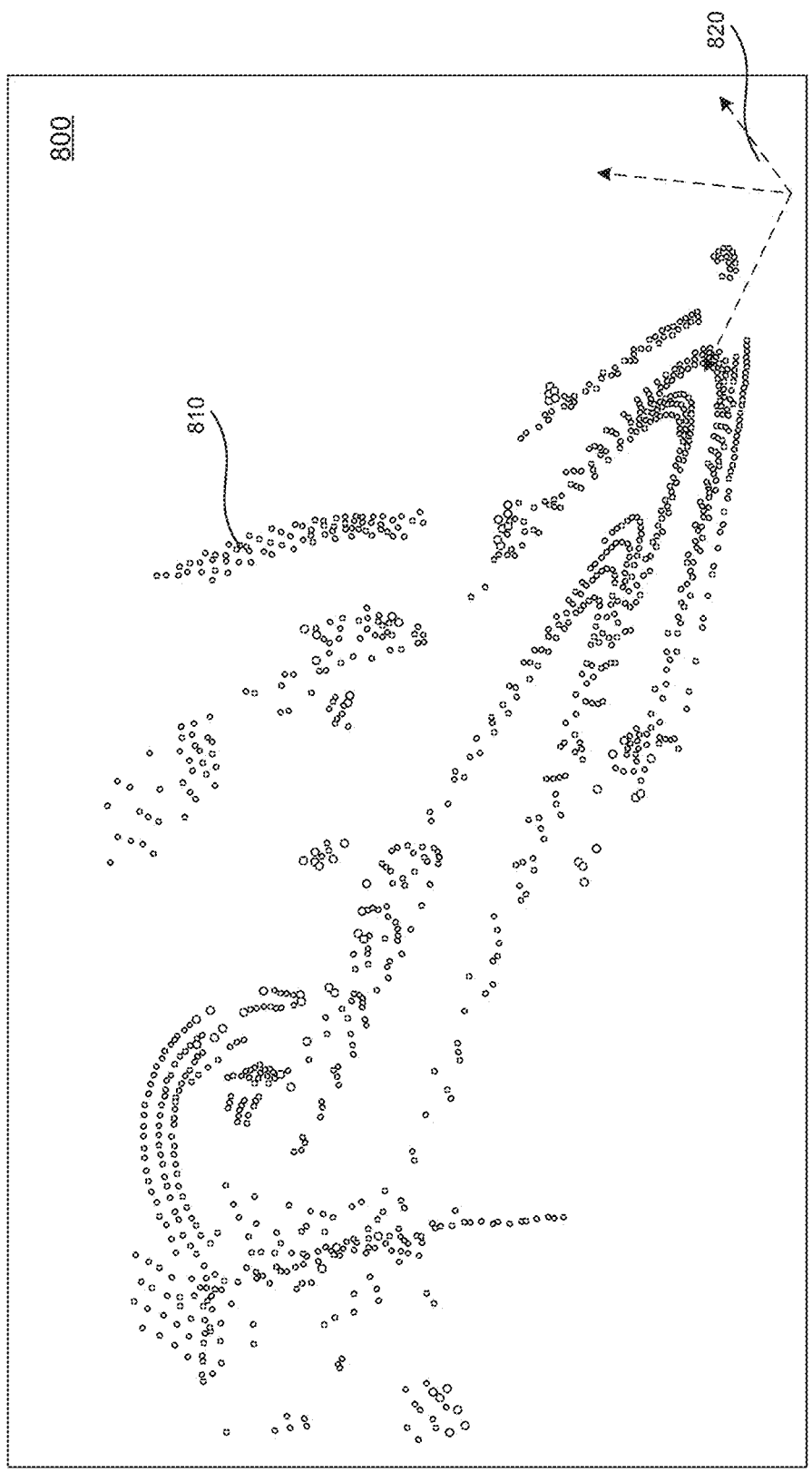
FIG. 8 illustrates one frame of laser points of a laser sensor in accordance with some embodiments of the presently disclosed technology.

FIG. 8 illustrates one frame 800 of laser scanning points produced by a laser sensor (e.g., a small-angle laser sensor that implements a scanning pattern 102a of FIG. 1). As illustrated, a sparse set of laser scanning points 810 is distributed in a three-dimensional coordinate system 820 in a non-uniform manner. In some embodiments, the sparse and non-uniform distribution of points 810 may not provide enough data in an overlapping region for the calibration process disclosed herein to perform reliably.

Figure 9:
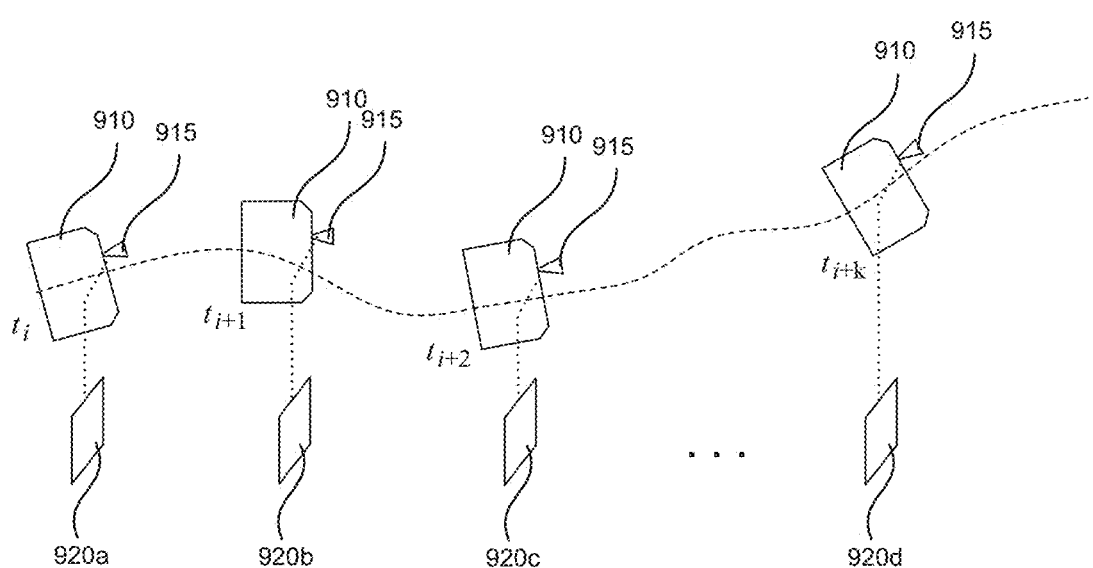
FIG. 9 illustrates a sequence of frames of point data generated by a laser unit (or laser sensor) carried by a mobile platform that moves during a period of time, in accordance with some embodiments of the presently disclosed technology.

FIG. 9 illustrates a sequence of frames of scanning point data generated by a laser unit (or laser sensor) that is carried by a mobile platform, which moves during a period of time. As illustrated in FIG. 9, a laser unit (or laser sensor) 915 carried by a mobile platform 910 generates multiple frames 920 of scanning point data during a time period from $t_i$ to $t_{i+k}$. For example, frame 920a is generated at time $t_{i+1}$ with the mobile platform 910 (and the laser unit or sensor) situated in a first position/orientation, frame 920b is generated at a subsequent time $t_{i+1}$ with the mobile platform 910 (and the laser unit or sensor) situated in a second position/orientation, and frame 920c is generated at a subsequent moment $t_{i+2}$ with the mobile platform 910 (and the laser unit or sensor) situated in a third position/orientation. Portions of the presently disclosed technology can generate a combined point cloud based on temporally sequenced sets of point data, such as the sequence of frames 920.

Figure 10:
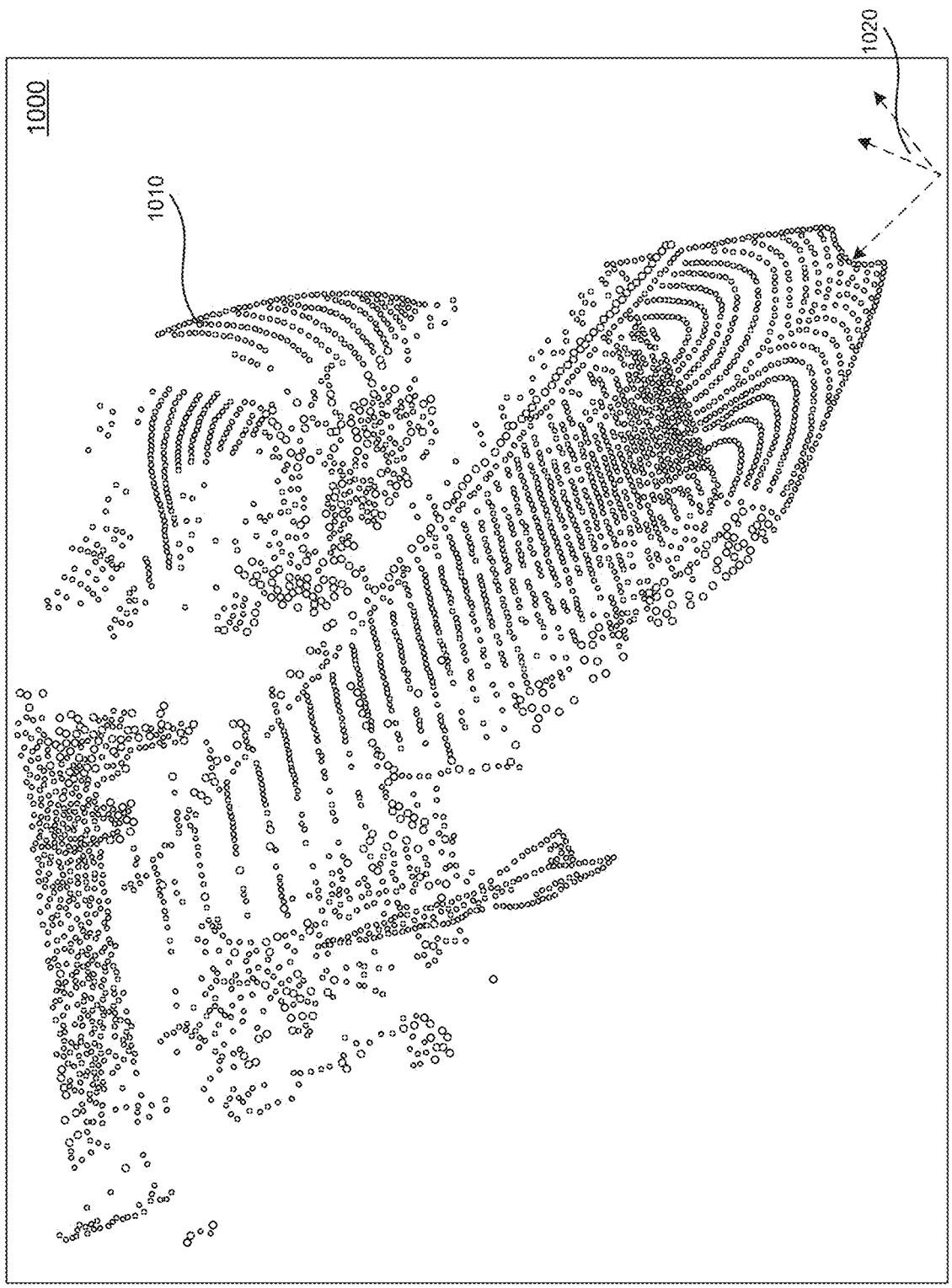
FIG. 10 illustrates a combined point cloud generated in accordance with some embodiments of the presently disclosed technology.

FIG. 10 illustrates a combined point cloud 1000 generated in accordance with some embodiments of the presently disclosed technology. As illustrated in FIG. 10, a dense set of laser scanning points 1010 that combines multiple sets of laser scanning points (e.g., similar to those of frame 800 in FIG. 8) is distributed in a three-dimensional coordinate system 1020 in a relatively uniform manner to provide comprehensive three-dimensional environmental information. In some embodiments, the calibration process disclosed herein utilizes such combined point clouds rather than single frame of point data.

To combine multiple frames of point data in a manner that reduces noise and error, the presently disclosed technology includes estimating a relative transformation matrix between successive frames by using multiple types of sensors carried by a mobile platform.

Figure 11:
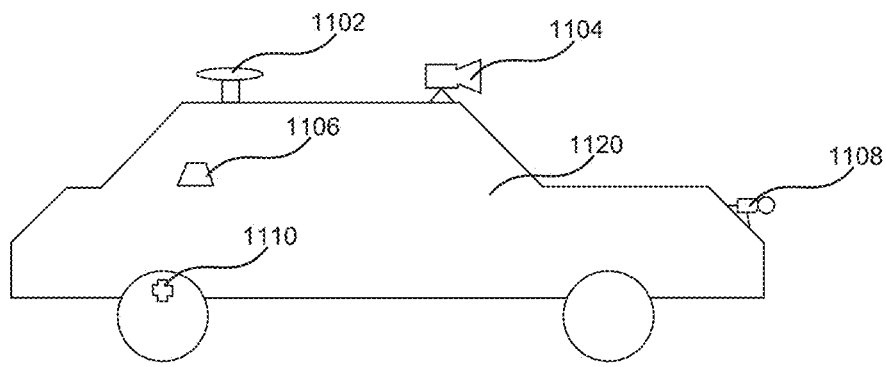
FIG. 11 illustrates a mobile platform that carries multiple sensors in addition to a laser unit, in accordance with some embodiments of the presently disclosed technology.

FIG. 11 illustrates a mobile platform 1120 that carries multiple sensors in addition to a laser unit (or sensor), in accordance with some embodiments of the presently disclosed technology. As illustrated, the mobile platform may carry a stereo camera 1104, an inertial measurement unit 1106, a wheel encoder 1110, and/or a global positioning system (GPS) 1102, in addition to a laser unit 1108. Those of skill in the relevant art will appreciate that fewer, more, or alternative sensors may be used by the presently disclosed technology. For example, instead of using the stereo camera 804, a set, array, or system of multiple cameras can be used.

Figure 12:
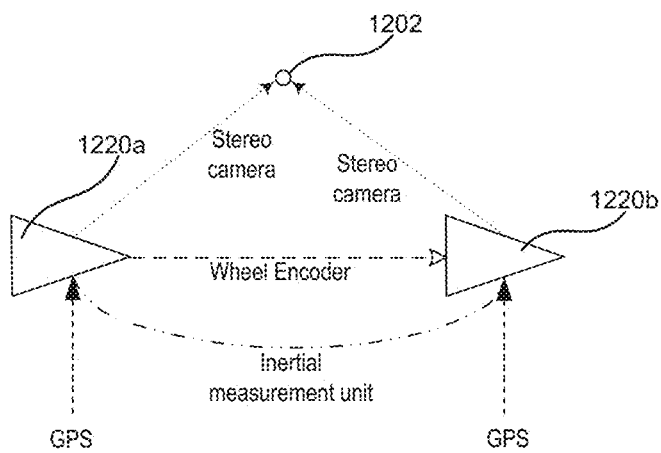
FIG. 12 illustrates information that can be provided by the multiple sensors of FIG. 11, in accordance with some embodiments of the presently disclosed technology.

FIG. 12 illustrates information that can be provided by the multiple sensors of FIG. 11. The stereo camera 1104 can provide three-dimensional coordinates of environmental features 1202 (e.g., one or more distinctive points in three dimensional space of surrounding environment), which may establish a constraint relationship between successive frames (e.g., corresponding to observations from two different positions 1220a and 1220b). Illustratively, the sampling frequency or data acquisition rate of the stereo camera 1104 is between 20 Hz and 40 Hz. The inertial measurement unit 1106 can provide high-frequency acceleration information and angular velocity information. Illustratively, the sampling frequency or data acquisition rate of the inertial measurement unit is 200 Hz or higher. Via integration, a transformation matrix of the mobile platform 1120 between two successive frames can be calculated. The wheel encoder 1110 can provide the rotation speed of the powered wheels (e.g., rear wheels) and steering information of the front wheels, and can provide, according to a known wheel size, constraints on forward speeds and deflection angles between successive frames. Illustratively, the sampling frequency or data acquisition rate of the wheel encoder is about 20 Hz. Depending on outdoor signal conditions, the GPS 1102 can provide the position of the mobile platform 1120 and attitude information thereof in global system. Illustratively, the sampling frequency or data acquisition rate of the GPS is below 5 Hz. Illustratively, the laser unit 1108 (e.g., including one or more LiDAR sensors) has a sampling frequency or data acquisition rate of 10 Hz.

The table below summarizes typical data acquisition frequency information of the representative sensors illustrated in FIGS. 11 and 12:

| Sensor | Frequency |
| --- | --- |
| Laser | 10 hz |
| Stereo camera | 20 hz to 40 hz |
| Inertial measurement unit | >200 hz |
| Wheel encoder | approximately 20 hz |
| Global positioning system | 5 hz |

Figure 13:
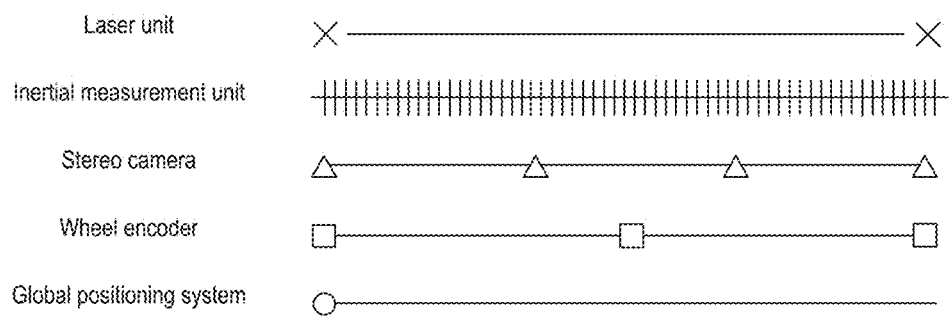
FIG. 13 illustrates data collection frequency differences of the multiple sensors and the laser unit of FIG. 11, in accordance with some embodiments of the presently disclosed technology.

FIG. 13 illustrates data collection frequency differences of the multiple sensors and the laser unit of FIG. 11, in accordance with some embodiments of the presently disclosed technology.

Figure 14:
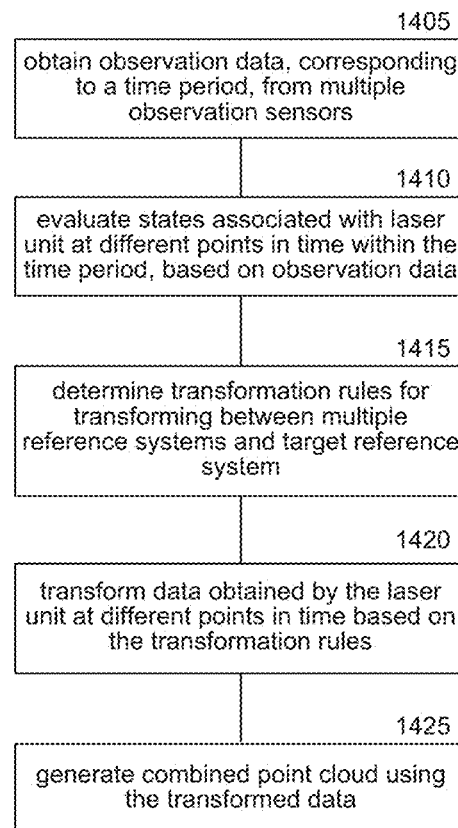
FIG. 14 illustrates a process for combining time sequenced point information generated by a laser unit to form a point cloud in accordance with some embodiments of the presently disclosed technology.

FIG. 14 illustrates a process for combining time sequenced point information generated by a laser unit to form a point cloud in accordance with some embodiments of the presently disclosed technology. The process can be implemented by a controller (e.g., an onboard computer of a mobile platform, an associated computing device, and/or an associated computing service). As part of the presently disclosed technology, generating a combined point cloud can include estimating relative states associated with the laser unit over a period of time, instead of estimating all subsequent states with respect to a global coordinate system. Illustratively, embodiments of the presently disclosed technology estimate relative position information of the laser unit with respect to two or more different frames that it generates in the period of time, thereby enabling accurate accumulation of laser point data from different frames in this period of time. This approach can facilitate or enhance subsequent calibration, object detection, mapping, and/or positioning operations.

Step 1405 of the process includes obtaining observation data, corresponding to a period of time, from multiple observation sensors (e.g., the multiple sensors as illustrated in FIG. 8). In some embodiments, methods in accordance with the presently disclosed technology include may make an approximation that data from different sensors is synchronized. For example, in a representative case the data acquisition frequency of the target laser unit is 10 Hz, the frequency of the stereo camera is 40 Hz, the frequency of the wheel encoder is 20 Hz, the frequency of the inertial measurement unit is 200 Hz, and the frequency of the GPS is 5 Hz. As an approximation, observation data from different sensors can be considered as accurately aligned according to different frequency multiples. Accordingly, using a 1-second time window as an example, the controller can obtain 200 accelerometer and gyroscope readings (from the inertial measurement unit), 40 frames of stereo camera observation, 20 groups of speed and deflection angle observations (from the wheel encoder), and 5 pieces of GPS positioning information. Based on these, embodiments of the presently disclosed technology can estimate relative positions between 10 laser unit data acquisition events or positions thereof with respect to a particular local coordinate system (such as a local coordinate system corresponding to the first of the 10 data acquisition events).

In some embodiments, the presently disclosed technology includes a further approximation that the position of the laser unit coincides with that of the stereo camera, thereby further simplifying the problem to be solved. As discussed with reference to FIG. 12, the observation data from the different sensors can be described mathematically as follows:

1) According to the observation data from the stereo camera, illustratively three-dimensional coordinates and/or descriptor(s) of one or more environmental features (e.g., feature 1202) can be extracted from frames produced by the camera at positions 1220a and 1220b, respectively. These coordinates and/or descriptor(s) can be matched with respect to the feature 1202. In an objective function for optimization, this type of observation can be embodied by an error item relating to the re-projection of feature(s) onto the camera coordinate systems at different positions. For example, the cost term based on an environment feature and two consecutive frames of stereo camera observation includes 3 parts: (a) a re-projection error between the left camera and right camera at a frame corresponding to position 1220a; (b) a re-projection error between the left camera and right camera at a frame corresponding to position 1220b; and (c) a re-projection error between the left (or right) camera at two positions 1220a and 1220b.

2) According to the observation data from the inertial measurement unit with known timestamp and initial values, a constraint relationship of a rotation matrix, a translation vector, and a speed between two consecutive camera frames can be calculated, for example, by using suitable integration techniques known to those of skill in the relevant art. This type of observation can be embodied by an error item between the post-integration state and a real state in the objective function. Illustratively, the variables to be estimated at each frame, e.g., camera frames corresponding to positions 1220a and 1220b, include the camera's orientation (e.g., an element in Special Orthogonal group), and position and velocity (e.g., elements in $R^3$ space group.) Integration using observations captured from the inertial measurement unit provides the constraints between the variables explained above. In some embodiments, while a state is optimized iteratively, suitable pre-integration technique is adopted to improve computational efficiency.

3) A motion model including the speed and deflection angle of the mobile platform can be derived based on observation data from the wheel encoder. Similarly, via integration, a state constraint between consecutive camera frames can be obtained, and the expression of this type of observation can be similar to that of the inertial measurement unit. In some embodiments, in contrast to the situation of the inertial measurement unit, only a sub-space of the state is constrained (e.g., the position and the yaw angle of the mobile platform) based on the wheel odometer observations. Due to possible noise of the wheel encoder, the covariance of this error term can be set to be relatively larger in some embodiments.

4) The observation data from the GPS can directly provide a constraint on a state of the mobile platform at a particular time. In the objective function, this type of observation can be expressed as an error between an estimated state provided by the GPS and a real state value. Due to the low data acquisition frequency of the GPS in some embodiments, the GPS observation may only be used when its noise level lower than certain threshold and/or its accuracy guaranteed within certain range.

In embodiments for which the position of the laser unit is approximated as coinciding with that of the stereo camera, a controller (e.g., an onboard computer of the mobile platform, an associated computing device, and/or an associated computing service) obtains observation data that can be provided by the sensors for a period of time from time 1 until time k. The observation data can be expressed as follows:

$$Z_k = \{C_{1:k}, \mathcal{I}_{1:k-1}, \mathcal{W}_{1:p}, \mathcal{G}_{1:q}\}$$

where 1) the first element $C_{1:k}$ denotes observation information obtained by the stereo camera, and may be defined as follows:

$$C_i = \{z_{i,1}, z_{i,2}, \ldots, z_{i,l}\}$$

where $z_{i,j}$ denotes an observation of a $j^{th}$ feature in the $i^{th}$ frame by the stereo camera;

2) the second element $\mathcal{I}_{1:k-1}$ denotes a set of data acquired by the inertial measurement unit until the $k^{th}$ point in time, where $\mathcal{I}_i = \{I_i, I_{i+1}, I_{i+2}, \ldots, I_{i+m}\}$ denotes a set of all observations by the inertial measurement unit between the $i^{th}$ frame produced by the camera and the $i+1^{th}$ frame produced by camera (e.g., a total of 20 readings from the inertial measurement unit between 2 successive camera observations);

3) the third element $\mathcal{W}_{1:p}$ denotes the observation by the wheel encoder, which may be expressed as follows:

$$\mathcal{W}_{i,j} = [v_{i,j}^W, q_{i,j}^W]$$

where $v_{i,j}^W$ denotes speed information obtained by the wheel encoder at the $i^{th}$ point in time and the $j^{th}$ point in time and $q_{i,j}^W$ denotes a rotation transformation (e.g., quaternion expression), which can be derived or otherwise obtained by a deflection angle calculation, between the $i^{th}$ point in time and the $j^{th}$ point in time; and 4) the last element $\mathcal{G}_{1:q}$ expresses the observation obtained by the GPS:

$$\mathcal{G}_i = [p_i^G, q_i^G]$$

where $p_i^G$ denotes a global position of the $i^{th}$ point in time, and $q_i^G$ denotes rotation with respect to a global coordinate system.

Step 1410 of the process includes evaluating states associated with the laser unit at different points in time within the time period based on the observation data. For example, using a factor graph, the controller may establish a relationship between an a priori probability and an a posteriori probability associated with states $X_k = \{x_k\}_{k=1 \ldots n}$ of the laser unit (coincident with the stereo camera):

$$p(X_k | Z_k) \times p(X_0) p(Z_k | X_k) = p(X_0) \prod_{i \in k-1} p(\mathcal{I}_0 | x_i, x_{i-1}) \prod_{i,j \in k} p(\mathcal{W}_{i,j} | x_i \cdot$$

-continued $$x_j) \prod_{i \in m} p(\mathcal{G}_i | x_k) \prod_{i \in k} \prod_{i \in C_i} p(z_{i,j} | x_i)$$

where k=[1, 2, ..., k] denotes a set of observation indexes of the camera, m denotes a set of observation indices of the GPS, and a state of the laser unit can be expressed as:

$$x_k = [p_k, v_k, q_k]$$

where $p_k$, $v_k$, and $q_k$ respectively denote a position, a speed, and a quaternion (rotation) of the laser unit with respect to a particular coordinate system at the $k^{th}$ point in time. In the above formula, each p( ) is called a factor of the factor graph.

In some embodiments, using a mathematical derivation based on an assumption of zero-mean Gaussian white noise, the controller may compute a maximum-a-posteriori of the above factor graph based formula by solving for a minimum of the following formula:

$$X_k^* = arg \min_{X_k} -\log p(X_k | Z_k) = arg \min_{X_k} \|r_0\|_{\Sigma_*}^2 + \sum_{i \in k-1} \|r_{X_i}\|_{\Sigma_{X,i}}^2 +$$

$$\sum_{i,j \in k} \|r_{W_{i,j}}\|_{\Sigma_{X_{i,j}}}^2 + \sum_{i \in m} \|r_{\mathcal{G}_i}\|_{\Sigma_{\mathcal{G}_i}}^2 + \sum_{i \in k} \sum_{l \in C_i} \|r_{\mathcal{G}_{i,j}}\|_{\Sigma_{\mathcal{G}_{i,j}}}^2$$

where r* represents different residual types, and $\Sigma_+$ denotes covariance matrices corresponding to different types of residuals, and is used to describe the uncertainty of the observation. In this regard, those of skill in the relevant art can determine residual models for different sensors and determine Jacobian matrices between optimization iterations. The controller can calculate optimal values for the laser unit states based on the minimization, for example, based on a gradient-based optimization method.

Step 1415 of the process includes determining transformation rules for transforming between multiple reference systems (e.g., at different points in time) and a target reference system. Illustratively, according to the following approximations: (1) the positions of the stereo camera and laser unit coincide with each other; and (2) timestamps of data acquired by the laser unit and data acquired by the camera are exactly the same, the controller can compute relative transformation matrices for the laser unit at different points in time with respect to a target point in time (i.e., when the subject period of time starts, half-way through the subject time period, or when the subject period of time ends) using corresponding states as determined.

In some embodiments, the approximations that (1) the positions of the stereo camera and laser unit coincide with each other; and (2) timestamps of data acquired by the laser unit and data acquired by the camera are exactly the same are not used. In these embodiments, the presently disclosed technology can account for two factors: (1) relative changes (e.g., the transformation matrix $_cT_l$ between the stereo camera and the laser unit; and (2) a timestamp difference between different sensors. Regarding the first factor (1), because the laser unit and the stereo camera are not likely to move relative to each other during the subject period of time, the controller may calculate a relative position of the laser unit at any $q^{th}$ point in time with respect to any $p^{th}$ point in time during the subject time period by simply calculating a relative position of the camera at time q with time p. As for the second factor (2) where timestamps between different sensors cannot be perfectly synchronized, the controller may use interpolation (e.g., based on a polynomial fitting) to compute relative position information in a coordinate system (e.g., a coordinate system of the mobile platform) at the time of any specified timestamp.

Step 1420 of the process includes transforming data obtained by the laser unit at different points in time based on the transformation rules. Illustratively, using the relative transformation matrices as determined in step 1415, the controller can re-project data (e.g., laser scanning points) acquired at different points in time (e.g., different frames) in the subject time period, to the target point in time. In some embodiments, the controller can exclude certain points in time from the re-projection process due to excessive noise, data error, or other factors. Step 1425 of the process includes generating a combined point cloud using the transformed data. Illustratively, the controller can add the re-projected data from multiple (selected) frames to the frame of point data initially associated with the target point in time, thereby accumulating temporally sequenced frames of data to form a combined point cloud as if the data were all acquired by the laser unit at the target point in time.

Figure 15:
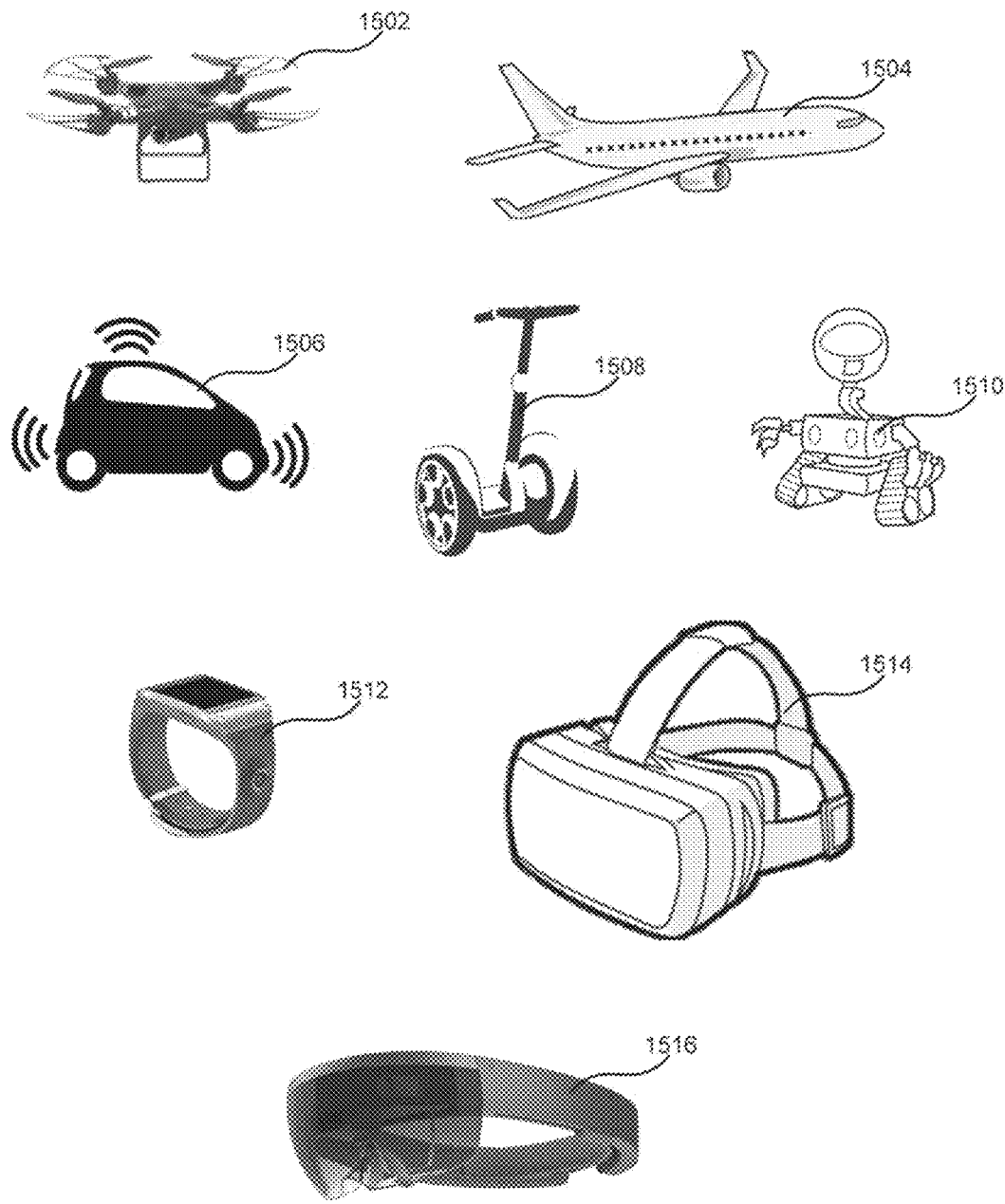
FIG. 15 illustrates examples of mobile platforms configured in accordance with some embodiments of the presently disclosed technology.

FIG. 15 illustrates examples of mobile platforms configured in accordance with various embodiments of the presently disclosed technology. As illustrated, a representative mobile platform as disclosed herein may include at least one of an unmanned aerial vehicle (UAV) 1502, a manned aircraft 1504, an autonomous car 1506, a self-balancing vehicle 1508, a terrestrial robot 1510, a smart wearable device 1512, a virtual reality (VR) head-mounted display 1514, or an augmented reality (AR) head-mounted display 1516.

Figure 16:
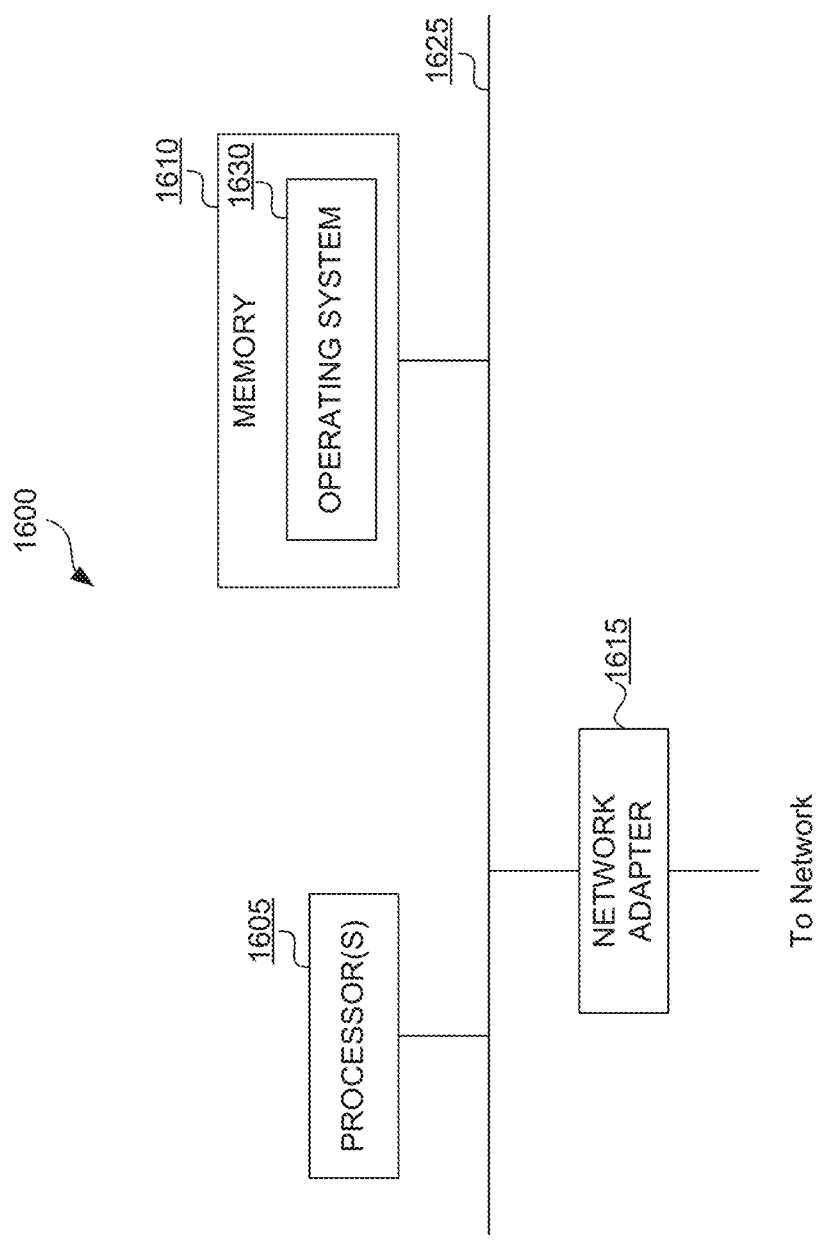
FIG. 16 is a block diagram illustrating a representative architecture for a computer system or other control device that can be utilized to implement various portions of the presently disclosed technology.

FIG. 16 is a block diagram illustrating an example of the architecture for a computer system or other control device 1500 that can be utilized to implement various portions of the presently disclosed technology. In FIG. 16, the computer system 1600 includes one or more processors 1605 and memory 1610 connected via an interconnect 1625. The interconnect 1625 may represent any one or more separate physical buses, point to point connections, or both connected by appropriate bridges, adapters, or controllers. The interconnect 1625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire".

The processor(s) 1605 may include central processing units (CPUs) to control the overall operation of, for example, the host computer. In certain embodiments, the processor(s) 1605 accomplish this by executing software or firmware stored in memory 1610. The processor(s) 1605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1610 is or includes the main memory of the computer system. The memory 1610 represents any form of random access memory (RAM), read-only memory (ROM), flash memory, or the like, or a combination of such devices. In use, the memory 1610 may contain, among other things, a set of machine instructions which, when executed by processor 1605, causes the processor 1605 to perform operations to implement embodiments of the present invention.

Also connected to the processor(s) 1605 through the interconnect 1625 is a (optional) network adapter 1615. The network adapter 1615 provides the computer system 1600 with the ability to communicate with remote devices, such as the storage clients, and/or other storage servers, and may be, for example, an Ethernet adapter or Fiber Channel adapter.

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

As discussed above, the disclosed technology can utilize low-cost laser sensors to achieve wide angle FOV coverage, provide high precision calibration between laser sensors, detect disturbances to laser sensors, and generate combined point clouds based on point data obtained at different times. While advantages associated with certain embodiments of the technology have been described in the context of those embodiments, other embodiments may also exhibit such advantages, and not all embodiments need necessarily exhibit such advantages to fall with within the scope of the present technology. Accordingly, the present disclosure and associated technology can encompass other embodiments not expressly shown or described herein.

To the extent any materials incorporated herein conflict with the present disclosure, the present disclosure controls.

We claimed:

1. A computer-implemented method for calibrating at least a first emitter/detector unit and a second emitter/detector unit, both carried by a common mobile platform, the method comprising:
   determining an overlapping region between a first point cloud and a second point cloud, the first point cloud and the second point cloud being projected into a coordinate system of the common mobile platform, wherein the first point cloud is determined from data generated by the first emitter/detector unit and the second point cloud is determined from data generated by the second emitter/detector unit;
   comparing surface attributes of the first and second point clouds in the overlapping region; and
   generating at least one calibration rule for calibration between the first and second emitter/detector units based at least in part on comparing the surface attributes, wherein the at least one calibration rule includes at least one of a translational transformation or a rotational transformation.

2. The method of claim 1, wherein comparing surface attributes comprises matching a surface associated with the first point cloud with a surface associated with the second point cloud.

3. The method of claim 2, wherein matching a surface associated with the first point cloud with a surface associated with the second point cloud comprises determining normal vector information with respect to at least a portion of the first point cloud.

4. The method of claim 1, wherein comparing surface attributes further comprises evaluating a target function defined at least in part by a plurality of points of the first and second point clouds that are within the overlapping region.

5. The method of claim 4, wherein the target function comprises a rotational component and a translational component.

6. The method of claim 5, wherein comparing surface attributes further comprises keeping the translational component fixed.

7. The method of claim 4, wherein generating at least one calibration rule comprises optimizing the target function.

8. The method of claim 7, wherein optimizing the target function is based at least in part on a least squares method.

9. A non-transitory computer-readable medium storing computer executable instructions that, when executed, cause one or more processors associated with a mobile platform to perform actions comprising:
   determining an overlapping region between a first point cloud and a second point cloud, the first point cloud and the second point cloud being projected into a coordinate system of the mobile platform, wherein the first point cloud is determined from data generated by a first emitter/detector unit and the second point cloud is determined from data generated by a second emitter/detector unit;
   comparing surface attributes of the first and second point clouds in the overlapping region; and
   generating at least one calibration rule for calibration between the first and second emitter/detector units based at least in part on comparing the surface attributes, wherein the at least one calibration rule includes at least one of a translational transformation or a rotational transformation.

10. The computer-readable medium of claim 9, wherein the at least one calibration rule includes a rule for transformation between coordinate systems of the first emitter/detector unit and the second emitter/detector unit.

11. The computer-readable medium of claim 9, wherein the actions further comprise detecting a difference between the generated at least one calibration rule and one or more previously generated calibration rules.

12. The computer-readable medium of claim 9, wherein determining an overlapping region comprises determining one or more pairs of nearest neighbor points between the first point cloud and the second point cloud.

13. The computer-readable medium of claims 9, wherein determining an overlapping region comprises creating a tree-shaped data structure for at least one of the first or second point clouds.

14. The computer-readable medium of claim 9, wherein the mobile platform includes at least one of an unmanned aerial vehicle (UAV), a manned aircraft, an autonomous car, a self-balancing vehicle, a robot, a smart wearable device, a virtual reality (VR) head-mounted display, or an augmented reality (AR) head-mounted display.

15. The computer-readable medium of claim 9, wherein the actions further comprise causing calibration of the first and second emitter/detector units in accordance with the at least one calibration rule.

16. A vehicle including a controller programmed to at least partially control one or more motions of the vehicle, wherein the programmed controller includes one or more processors configured to:
determine an overlapping region between a first point cloud and a second point cloud, the first point cloud and the second point cloud being projected into a coordinate system of a mobile platform, wherein the first point cloud is determined from data generated by a first emitter/detector unit and the second point cloud is determined from data generated by a second emitter/detector unit;
compare surface attributes of the first and second point clouds in the overlapping region; and
generate at least one calibration rule for calibration between the first and second emitter/detector units based at least in part on comparing the surface attributes, wherein the at least one calibration rule includes at least one of a translational transformation or a rotational transformation.

17. The vehicle of claim 16, further comprising the first emitter/detector, and wherein the first emitter/detector unit includes at least one laser sensor.

18. The vehicle of claim 17, wherein the first emitter/detector unit includes a plurality of laser sensors rigidly fixed relative to each other.

19. The vehicle of claim 16, wherein comparing surface attributes comprises determining normal vector information with respect to at least a portion of at least one of the first point cloud or the second point cloud.

20. The vehicle of claim 16, wherein generating at least one calibration rule is based on optimizing a target function defined at least in part by the surface attributes of the first and second point clouds in the overlapping region.

* * * * *